United States Patent [19]
Davis

[11] 3,962,873
[45] June 15, 1976

[54] SOLAR STEAM GENERATOR

[75] Inventor: Jerry P. Davis, Concord, Mass.

[73] Assignee: Thermo Electron Corporation, Waltham, Mass.

[22] Filed: May 20, 1974

[21] Appl. No.: 471,417

[52] U.S. Cl. ................................. 60/641; 60/618
[51] Int. Cl.² ........................................ F03G 7/02
[58] Field of Search ............ 60/641, 648, 659, 676, 60/698, 618; 126/271

[56] References Cited
UNITED STATES PATENTS

| | | | |
|---|---|---|---|
| 1,066,348 | 7/1913 | Voorhees | 60/649 |
| 2,969,637 | 1/1961 | Rowekamp | 60/659 X |
| 3,468,762 | 9/1969 | Klitzsch | 60/648 X |

Primary Examiner—Allen M. Ostrager
Attorney, Agent, or Firm—James L. Neal

[57] ABSTRACT

Low pressure steam generated by a solar collector is compressed to raise its temperature and pressure. The compressor is driven by an engine which is, in turn, driven by a combustible fuel. Shaft work produced from the fuel is used directly to drive the compressor. The energy available from the steam is the sum of that resulting from both solar energy and combustion of fuel. The total amount of steam produced per Btu of heat generated by fuel input to the engine is substantially greater than the amount of steam that would be produced directly by combustion of the fuel.

8 Claims, 3 Drawing Figures

SOLAR STEAM GENERATOR

BACKGROUND OF THE INVENTION

The rising cost of fuel and the increase in demand for energy are among factors which require efforts both to develop new sources of energy and to more effectively use the present sources of energy.

Substantial benefits can be derived from conserving fuel used to generate process steam. For example, approximately (45%) of the fuel used in industry is consumed in the generation of process steam.

It is the object of this invention to provide a system for the production of process steam at substantial reduction in fuel consumption over conventional direct firing means.

It is a further object of this invention to utilize solar energy in the production of process steam.

It is also an object of this invention to generate low pressure steam by a low cost solar collector and thereafter economically convert the low pressure steam into high pressure process steam.

Process steam is that steam used in industrial processes, as for example, in iron and steel, petroleum refining, paper, aluminum, copper and cement industries and the like. Process steam is also used for heating buildings and local power generation. In these and other similar purposes, one of the requirements of the steam is that it be at a useful pressure, usually above 2 atmospheres. A pressure of 65 pounds per square inch absolute may be taken as a typical steam pressure suitable for process steam.

SUMMARY OF THE INVENTION

Solar collectors capable of steam generation may be separated according to those which focus radiant solar energy onto a surface to be heated and those which do not. Focusing solar collectors are capable of producing steam at higher pressures than non-focusing collectors. However, focusing collectors capable of producing process steam are characterized by very high cost which renders them impractical in the current state of technology, in view of any fuel price levels which are presently foreseeable. The non-focusing collectors are substantially less expensive but are capable of producing steam only at very low pressure. This low pressure steam is not useable as process steam. Thus, insofar as process steam is concerned, heat energy from the sun collected by the flat plate solar collectors is not useable.

Flat plate solar collectors will generate steam at temperatures from 150°F to 250°F, depending upon the available incident solar flux. The steam pressure is the corresponding saturation pressure. For example, at 150°F the corresponding saturation pressure is approximately 4 psia. At 240°F the corresponding saturation pressure is approximately 25 psia. In a typical circumstance, collectors generate saturated steam at approximately 180°F and 7.5 psia. This steam is compressed and raised in temperature by a compressor driven by a fuel-fired engine. The compressor converts the low pressure steam from the solar collector to high pressure process steam. The reject heat in the engine exhaust gas and ebulliently cooled jacket water heat (when available) are also utilized for process steam generation. The total useful energy stored in the process steam is equal to the sum of both the heat energy received from solar flux in the solar collector and the energy resulting from the combustion of fuel in the engine driven compressor less a relatively small loss from non-utilized reject heat of the engine. The yield of process steam per unit to fuel consumed can be three or more times that which would be generated by direct firing techniques.

DETAILED DESCRIPTION OF THE DRAWINGS

Figure 1:
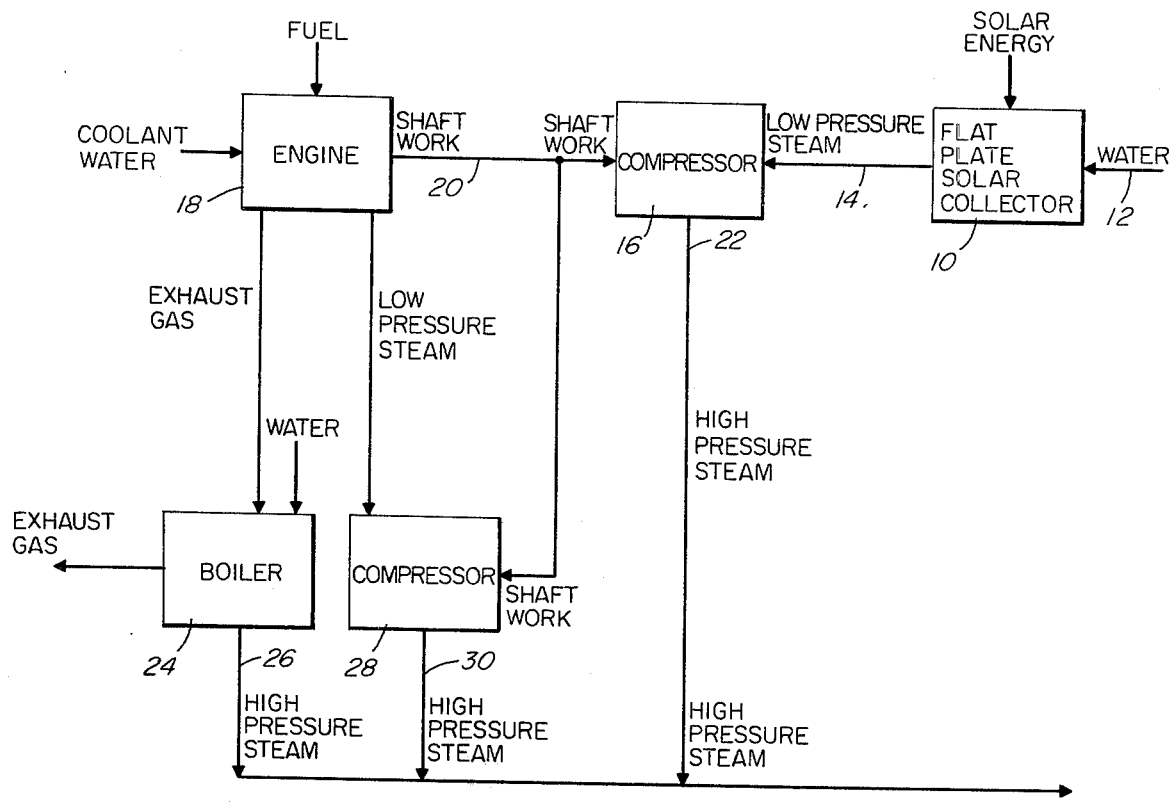
FIG. 1 is a block diagram of a preferred embodiment of the invention.

In the system of FIG. 1, the solar collector 10 receives solar energy for vaporizing water admitted through an input 12. Steam from the solar collector flows through an outlet 14 to a compressor 16.

The compressor 16 is driven by an engine 18 which, for example, may be a Diesel engine. The engine produces shaft work from the combustion of fuel and the shaft 20 drives the compressor 16. The compressor 16 elevates the temperature and pressure of steam from the solar collector 10 and provides useful process steam through compressor outlet 22. The entire system is sealed to exclude air.

In the preferred embodiment of FIG. 1, waste heat from the engine 18 is used to provide additional process steam. Exhaust gases from the engine pass through a boiler 24 to produce high pressure steam at the boiler outlet 26. The engine cooling system employs a continuous flow of cooling water to the engine and rejects a continuous flow of low pressure steam. A second compressor 28 driven by the shaft 20 compresses low pressure steam from the engine ebullient cooling system (when available) to provide an additional supply of high pressure steam at its outlet 30. Ultimately the three sources of high pressure steam are combined to provide a single high pressure process steam source.

The solar collector 10 may be of any appropriate type. For example, a conventional flat plate solar collector is suitable. Typical flat plate solar collectors incorporate a layer of thermal insulation on which an array of steam tubes are supported. Over the steam tubes may be a flat plate solar energy absorber in heat transfer relationship to the steam tubes. Over the array of steam tubes and solar absorbers are provided conventional thermal convection suppressors and weather covers. Solar collectors may be coated with suitable material. Flat black paints are acceptable coatings. Other suitable coatings having requisite absorption characteristics are commercially available.

It is ordinarily preferred that the compressor 16 be one having a relatively high efficiency rating. It should be noted, however, that energy losses in the compressor will occur as heat energy added to the steam. Thus, the high pressure steam output from the compressor utilizes substantially all of the energy input to the compressor either by way of elevation to the temperature or the pressure.

Figure 2:
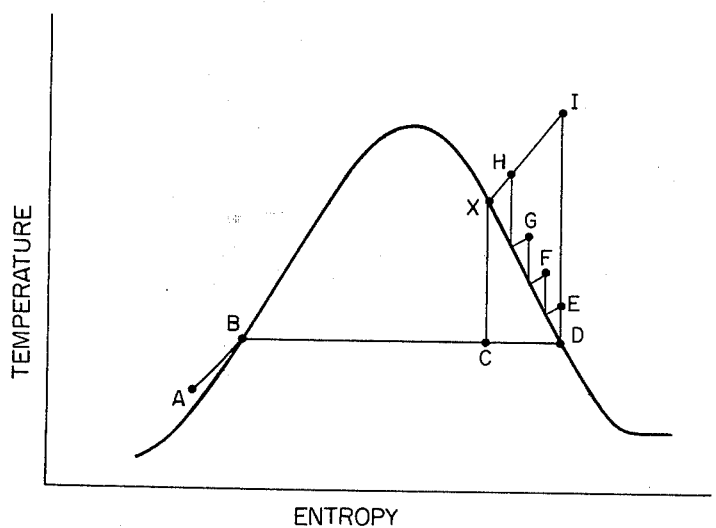
FIG. 2 is an idealized temperature-entropy diagram showing several possible paths to compressing low pressure steam to high pressure steam.

It will also be appreciated that the compressor may be operated in a variety of modes to tailor thermodynamic characteristics of the steam to those desired. For example, such tailoring can produce saturated steam at a given temperature. Referring to FIG. 2, the letter (X) designates the point on the saturation dome reflecting the desired temperature and pressure for the steam. The point designated by the letter (A) can be taken to represent the initial thermodynamic condition of water. The water is heated by solar energy to its saturation temperature (A–B); thereafter isothermal conversion of water to steam takes place (B–D) or to a two-phase water-steam mixture (B–C). It is possible to compress a steam and water mixture directly (C–X). However, this approach may be less efficient due to the unavailability of a suitably efficient and effective compressor to operate on the steam and water mixture. Accordingly, if saturated steam having thermodynamic properties indicated by the letter (X) is to be produced, it is preferred to produce saturated steam at lower temperatures (B–D) and then raise the temperature and pressure to yield the conditions at point (X). To bring the thermodynamic properties of the steam from point (D) to point (X), isentropic compression to the point (I) can be carried out, where the pressure at point (I) equals the pressure at point (X). Thereafter, sufficient water can be added to the resultant superheated steam to bring it to the saturated condition (X). In adding the water to the superheated steam, the superheat energy is essentially utilized to convert liquid to additional saturated steam at condition (X). However, this path, though acceptable, requires greater compression work than a staged compression.

The amount of compression work required to produce saturated steam having thermodynamic properties designated at point (X) can be reduced by compressing the saturated steam in a staged fashion. That is, a first isentropic compression stage (D–E) is followed by an addition of a small amount of water to superheated steam having thermodynamic properties represented by point (E). Saturated steam results, as indicated by the point just above point (D) on the vapor dome. Thereafter, a further compression stage produces superheated steam as indicated at point (F). The cycle is repeated with the addition of a small amount of water, compression to point (G), the addition of a third small amount of water and compression to point (H), where the pressure equals the pressure at point (X). Then a final addition of a small amount of water brings the thermodynamic properties of the steam to the saturated steam condition at point (X).

Referring again to the example of FIG. 2, it is more economical from the standpoint of fuel usage to produce steam having the thermodynamic properties represented by point (X) using the staged compression technique than it is to produce superheated steam having characteristics represented by point (I). However, there are some uses for highly superheated process steam itself. In those cases, the path (D–I) is probable.

A specific example of the operation of the system from the thermodynamic standpoint will now be given. A Diesel engine having an efficiency of 40% is coupled with a single stage compressor having an efficiency of 80%. Per input of 1000 Btu from fuel (higher heating value) to the Diesel engine, there will be provided shaft work of 400 Btu. The solar collector receives water at 68°F. Collection of 1685 Btu of solar energy per 1000 Btu of fuel (hhv) to the compressor by the solar collector provides saturated steam at a selected 180°F and 7.5 psia. Shaft work is divided between (383) Btu to the compressor 16 and (17) Btu of shaft work to the second compressor 28. The compressor 16 yields 1.55 pounds of steam at 65 psia and 708°F. If the cooling system of the engine 18 exhausts saturated steam at 250°F and containing 240 Btu of heat, the compressor 28 provides 0.22 pounds of steam at 65 psia and 426°F. With an exhaust gas having temperature of 700°F and 360 Btu of heat, water input at 68° will be converted to 0.17 pounds of steam at 65 psia and 600°F. The combining of the steam from the compressors 16 and 28 and the boiler 24 will result in 1.93 pounds of steam at a temperature of 668°F and a pressure of 65 psia. This is approximately three times the amount of steam that would be produced under comparable conditions from 1000 Btu of fuel if the steam were generated by direct firing in a conventional boiler having an efficiency of 85%.

Temperature and pressure conditions of the process steam can be tailored within a very broad range. As the desired thermodynamic conditions of the processed steam change, the extent to which this system is an advantage over the conventional direct fired system varies. For example, if the process steam pressure in the example given above was chosen to be 215 psia, the advantage over a conventional direct fired steam generation system would be expected to be a two-fold advantage.

Figure 3:
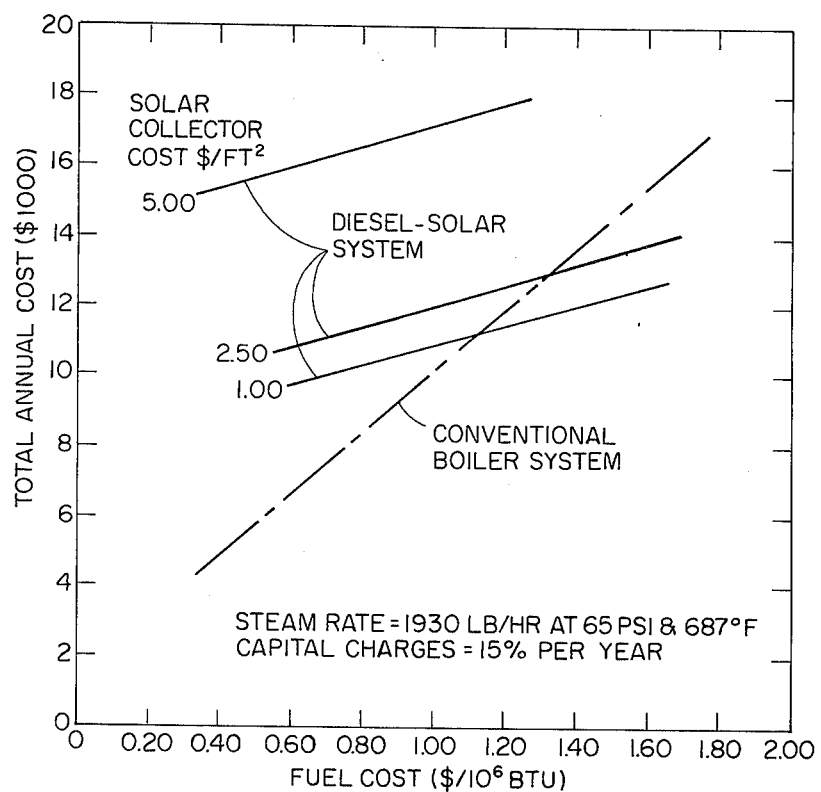
FIG. 3 is a plot showing the effect of varying fuel costs and solar-collector annual costs.

Since sunshine is intermittent, terrestrial solar energy systems can optionally employ either thermal storage, a backup conventional system, or both. The cost of capital for a conventional boiler system is relatively low compared to fuel costs. It is therefore possible to avoid all thermal storage by including 100 percent capacity in conventional standby equipment. When the engines for driving the compressor is a Diesel engine, low-grade residual fuels in common use can be used. See FIG. 3 which shows a plot of the relationship between fuel costs and solar-collector annual costs.

If the collector costs $2.50 per square foot, the break even point for economic Diesel-solar process steam raising should occur at a fuel cost of about $1.30 per million Btu. Adjusting for operating and maintenance costs, taken to be comparable to those of other power generating systems, the break even point occurs at about $1.45 per million Btu. Present fuel costs often exceed this level.

The foregoing describes a preferred embodiment of this invention. It will be understood by those skilled in the art, that modifications may be made therein without departing from the scope of the invention.

I claim:

1. A method for producing process steam comprising the steps of:
   a. generating steam by non-focusing solar collector means at pressures below the minimum pressure for useful process steam;
   b. pressurizing steam from said solar collector means by a mechanical compressor;
   c. driving said compressor by engine means energized as a result of fuel consumption; and
   d. producing and pressurizing steam in addition to the steam from said solar collector means by using waste heat from said engine means.

2. A system for converting water to process steam comprising:
   a. fluid tight means for confining water and steam;
   b. solar collector means in heat transfer relation with said fluid tight means for producing steam approximately within the temperature range from 150°F to 250°F and at a corresponding saturation pressure not in excess of approximately two atmospheres of pressure;

c. a compressor for receiving and pressurizing steam from said solar collector means;

d. means associated with said compressor forming an outlet for said pressurized steam;

e. engine means energized as a result of fuel consumption for driving said compressor; and f. means utilizing waste heat from said engine means for producing and pressurizing steam in addition to the steam from said solar collector means.

3. A system according to claim 2 wherein said solar collector means is non-focusing.

4. A system according to claim 3 further comprising:

a. means for discharging waste heat from said engine means; and b. boiler means for bringing such waste heat into heat transfer relationship with a supply of water to produce steam.

5. A system according to claim 4 wherein said engine means comprises an internal combustion engine.

6. A system according to claim 5 further comprising:

a. jacket cooling means for continually vaporizing water internal of said engine;

b. second compressor means for receiving and pressurizing steam from said engine coolant means; and c. egress means for discharging steam from said second compression means.

7. A system according to claim 6 wherein said internal combustion engine is a Diesel engine.

8. A system according to claim 6 for combining steam from said compressor outlet, boiler and egress means to produce a single source of process steam.

* * * * *